United States Patent [19]

Harman

[11] Patent Number: 5,461,683
[45] Date of Patent: Oct. 24, 1995

[54] APPARATUS AND METHOD FOR ALIGNING OPTICAL FIBERS

[76] Inventor: Murray R. Harman, 90 Ashpark Cres., Ottawa, Ontario, Canada, K1T 3N7

[21] Appl. No.: 243,891

[22] Filed: May 9, 1994

[51] Int. Cl.⁶ ..................................................... G02B 6/26
[52] U.S. Cl. .............................. 385/21; 385/20; 385/22; 385/16
[58] Field of Search ................................. 385/21, 20, 22, 385/17, 16

[56] References Cited

U.S. PATENT DOCUMENTS

| | | | |
|---|---|---|---|
| 4,204,742 | 5/1980 | Johnson et al. | 385/16 |
| 4,699,457 | 10/1987 | Goodman | 385/20 |
| 4,859,022 | 8/1989 | Opdahl et al. | 385/21 |
| 4,989,946 | 2/1991 | Williams et al. | 385/16 |

FOREIGN PATENT DOCUMENTS 0159614  6/1989  Japan ..................................... 385/20

*Primary Examiner*—Rodney B. Bovernick
*Assistant Examiner*—Yisun Song

[57] ABSTRACT

A ganged optical switch is provided for switching a first optical fiber into and out of axial alignment with a second optical fiber. The fibers are secured to first and second carriages respectively. By relatively moving the carriages, the optical fibers can be moved into and out of axial alignment. Two test optical fibers ganged to the first and second optical fibers provide test path for transmitting an optical signal along. The fibers forming the test path are positioned at particular locations on the carriages such that when the test optical fibers are axially aligned, the first and second fibers are guaranteed to be axially aligned. An optical detector is positioned at an end of one of the test fibers and an LED is provided at an end of the other of the test fiber. An indication of alignment is provided when light from the LED is detected by the optical detector.

9 Claims, 7 Drawing Sheets

APPARATUS AND METHOD FOR ALIGNING OPTICAL FIBERS

FIELD OF THE INVENTION

This invention relates generally to a controlled optical fiber switch and more particularly relates to a method and apparatus for moving optical fibers into alignment with one another.

BACKGROUND OF THE INVENTION

Switches are required in optical fiber systems, for example to redirect light from one fiber to another. There are two main types of switches, electro-optic or solid state devices (generally non-moving) and electromechanical. Solid state devices tend to be expensive and often have poor performance in terms of insertion loss and cross channel isolation. For routing applications where switching time is less critical, mechanical switches are typically used. Moving block electromechanical switches physically move optical fibers so that their ends can be in an abutting relationship with different optical fibers, as in U.S. Pat. No. 4,337,995 (Tanaka et al.); U.S. Pat. No. 4,189,206 (Terai et al.); U.S. Pat. No. 4,223,978 (Kummer et al.); and U.S. Pat. No. 4,407,562 (Young). The switch of U.S. Pat. No 4,568,143 (Yamada et al.) has a stationary block holding two input optical fibers and a movable block holding four output fibers to permit contact between the ends of various of the input fibers and output fibers. The switch of U.S. Pat. No. 4,441,785 (Petrozello) has a rotary drum containing short lengths of optical fibers by which incoming signals on one set of fibers can be channeled to different outgoing optical fibers. Some switches use a movable prism as in U.S. Pat. No. 4,790,621 (Calaby) and or combination of prisms as in U.S. Pat. No. 4,303,303.

More recently, U.S. Pat. No. 5,110,194 (Zurfluh) discloses a mechanical switch for selectably connecting or disconnecting ends of a first and second optical fiber by applying a lateral bending force on the fibers. The mechanical switch of U.S. Pat. No 5,239,599 (Harman) is formed by mounting one ore more optical fibers on support surfaces of two spaced support members, one or both of which are laterally movable. After mounting of the fibers, a transverse fine cut across the fibers produces a gap, providing extremely accurate positioning. A pivot member moved by a coil mounted on a lever extension, in conjunction with magnets, moves one or both support members via rods or similar members extending between the pivot member and the support members, one each side of the pivot axis of the pivot member.

Although many of the aforementioned devices adequately perform their intended function, the primary limitation of most of these switches is the movement accuracy and mechanical stability required to physically translate from one fiber to another while maintaining an air gap between the fiber ends a mere fraction of the thickness of a sheet of paper. For example, a single mode fiber moving switch could typically be made with optical fibers having a cladding (outer) diameter of 125 microns and an effective light carrying core of 6 to 9 microns in diameter. If fiber ends could be held axially aligned with some type of mechanical structure so as to be re-alignable and (thermally) stable within a tolerance of about 1 micron, then a useful switching structure can be obtained. Such fine movement accuracy generally requires a precise "closed loop" system using movement stages with position feedback sensors.

It is an object of this invention to provide an optical switch that will provide precision controlled movement.

It is also an object of this invention, to provide an inexpensive easy to use device that will offer a high level of accuracy when aligning optical fibers.

STATEMENT OF THE INVENTION

In accordance with the invention, there is provided an optical fiber switch comprising: a first support member having at a first optical fiber securing means for securing a first optical fiber at a first location, said support member having a second optical fiber securing means for securing a second optical fiber at a second location a first predetermined distance from the first location; a second support member having a first optical fiber securing means at a first location on the second support member for securing a third optical fiber, said first optical fiber securing means of the second support member being substantially adjacent to the first optical fiber securing means of the first member, and having a second optical fiber securing means at a second location on the second support member spaced a second predetermined distance from the first securing means on the second support member, said second support member being coupled to and relatively movable with the first support member, so that an optical fiber secured at the first location may be switched into and out of axial alignment with the third optical fiber at the first location on the second support member as the two support members are relatively moved; means for radiating light into an alignment optical fiber that is secured to the second optical fiber securing means on the second support member; and, means for detecting light from the second optical fiber secured by the second securing means, when said optical fiber is aligned with the alignment fiber.

In accordance with another aspect of the invention there is provided an optical fiber switch comprising: a first support member having a first optical fiber securing means for securing a first plurality of optical fibers in a predetermined spaced relationship at a first location, said support member having a second optical fiber securing means for securing a second plurality of optical fibers at a second location a first predetermined distance from the first location; a second support member having a first optical fiber securing means at a first location on the second support member for securing one or more optical fibers, said first optical fiber securing means being substantially adjacent to the first optical fiber securing means on the first member, and having a second optical fiber securing means on the second support member at a second location spaced a second predetermined distance from the first securing means on the second support member, said second support member being coupled to and relatively movable with the first support member, so that an optical fiber secured at the first location on the second support member may be axially aligned with different optical fibers of the first plurality of optical fibers at the first location on the first support member as the two support members are relatively moved; means for radiating light into an alignment optical fiber that is secured to the second optical fiber securing means on the second support member; and, means for detecting light from an optical fiber that is secured by the second securing means on the first support member, when said optical fiber is aligned with the alignment fiber.

In accordance with the invention, there is provided an optical switch for switching a first optical fiber into and out of axial alignment with a second optical fiber secured to a first and second carriage respectively, wherein the first and second carriages are relatively movable so that the secured optical fibers can be moved into and out of axial alignment, the switch comprising: a first alignment optical waveguide secured to the first carriage at a predetermined location; a second alignment optical waveguide secured to the second cardage at a predetermined location, the first and second alignment optical fibers being positioned at respective locations such that they are axially aligned when the first optical fiber and the second optical fibers are axially aligned.

In accordance with another aspect of the invention, a method is provided for switching a first optical fiber into and out of axial alignment with a second optical fiber secured to a first and second carriage respectively, wherein the first and second carriage are relatively movable so that the secured optical fibers can be moved into and out of axial alignment, the method comprising the steps of: directing optical radiation into an alignment optical waveguide that is secured to the second cardage at a predetermined location; and, determining the relative position of the first and second cardage means by detecting the location of the optical radiation radiating from an alignment optical waveguide secured to the first carriage.

BRIEF DESCRIPTION OF THE DRAWINGS

Exemplary embodiments of the invention will now be described in conjunction with the following drawings in which.

DETAILED DESCRIPTION

Figure 1:
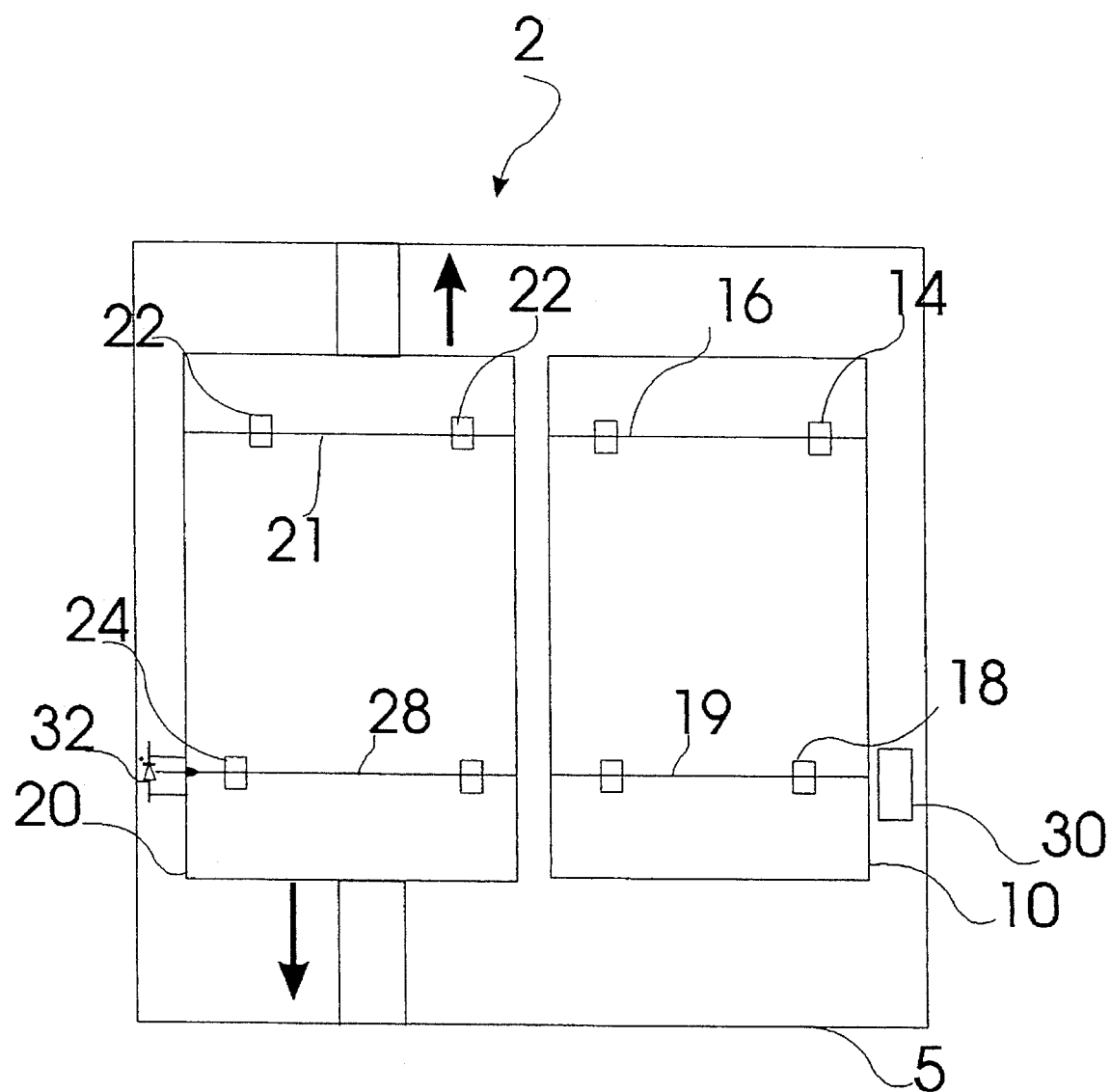
FIG. 1 is a block diagram of a mechanical optical on/off switch shown in an aligned "on" position.

Referring now to FIG. 1, an on/off optical fiber switch 2 is shown for switching an optical fiber 21 into and out of alignment with an another optical fiber 16. When the fibers 21 and 16 are axially aligned so that light can travel from one fiber to the other the switch 2 is said to be on. Alternately, when the fibers are misaligned preventing light from passing from one fiber to the other, the switch 2, is said to be off.

The switch 2 includes a support frame 5 that carries a non-movable first support member 10. A second support member in the form of a movable carriage 20 is slidably mounted to the frame 5 and is movable in the direction of the arrows shown, when a force is applied to it.

A first optical fiber 16 is secured at a first location to the support member 10 by securing means in the form of optical fiber clamps 14. Alternatively, the fibers could be secured by a securing means such as an adhesive or by grooves defined within the support member for accommodating and holding the fibers. At a second location on the member 10 second optical fiber clamps 18 secure a second optical fiber 19 spaced a distance $y_1$ from the first optical fiber 16.

Similarly, the movable carriage 20 includes a securing means in the form of optical fiber clamps 22 that hold a third optical fiber 21 in place. Conveniently and preferably, second optical fiber clamps 24 at a second location on the movable carriage are spaced a same distance $y_1$ from the first clamps 22 for securing and spacing optical fiber 28 the same distance from fiber 21 as fibers 16 and 19 are spaced apart. As the support members 10 and 20 are relatively moved the optical fibers 16 and 21 can be switched into and out of axially alignment.

A light source 32 and a detector 30 provide a means to determine when optical fibers 16 and 21 are aligned. The light source, in the form of a light emitting diode (LED) 32, is mounted to the movable carriage 20, adjacent an end of alignment optical fiber 28. Preferably, the optical detector 30 is secured adjacent an end of the optical fiber 19, and is positioned to detect the presence or absence of light transmitted through the alignment fiber depending upon whether fibers 28 and 19 are axially aligned. When the fibers are axially aligned as is shown in FIG. 1, light is detected; when the fibers are totally out of alignment, no light is detected. Since the optical fibers 19 and 28 are both the same distance $y_1$ from fibers 16 and 21 respectively, when optical fibers 19 and 28 are aligned fibers 16 and 21 are also aligned. As the optical fibers 19 and 28 are moved slowly into alignment, an increase in the intensity of the light is detected. More accurate alignment can be obtained by moving the fibers in one direction or another in accordance with the detected intensity or, by introducing feedback into the system.

Figure 3:
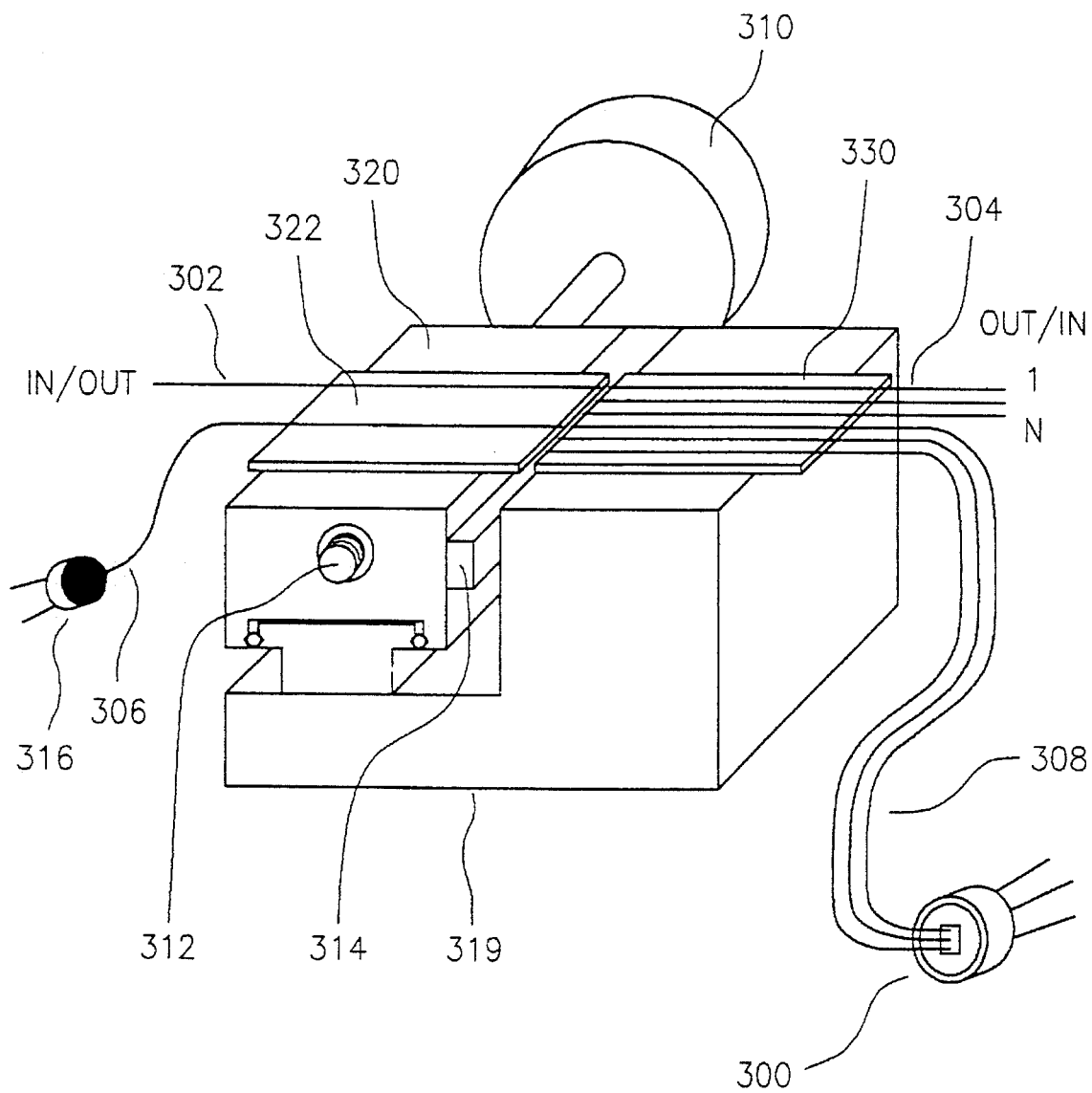

Turning now to FIG. 3, a motorized optical fiber switch that functions as a 1 to n or an n to 1 switch is shown, for switching an optical fiber 302 into alignment with one of n optical fibers; n in this example is equal to 3. A base 319 of the switch supports a planar fixture 330 upon which. three optical fibers 304 and three alignment fibers 308 are secured. A stage 320 coupled to and slidable on the base 319 supports a planar fixture 322, upon which optical fibers 302 and 306 are mounted being glued into position. A motor 310 is positioned to turn a lead screw 312 that is coupled to the stage 320 for moving it across the base 319. As the screw is turned the stage moves forward across the base 319. When the direction of the screw is reversed the stage moves backward across the base 319.

In operation, as the stage is moved, optical fiber 302 is moved into and out of axial alignment with different optical fibers 304. A position sensor 314 in the form of a slide potentiometer or linear variable displacement transducer (LVDT) is provided to allow an absolute measurement of position by the control circuitry shown in FIG. 4. The slide potentiometer allows coarse adjustment of the switch so that two fibers can be at least partially axially aligned to allow some light to pass from one fiber to another. Finer more precise alignment is achieved by using the LED 316, detector 300 and detection circuitry shown in FIG. 4.

Figure 2:
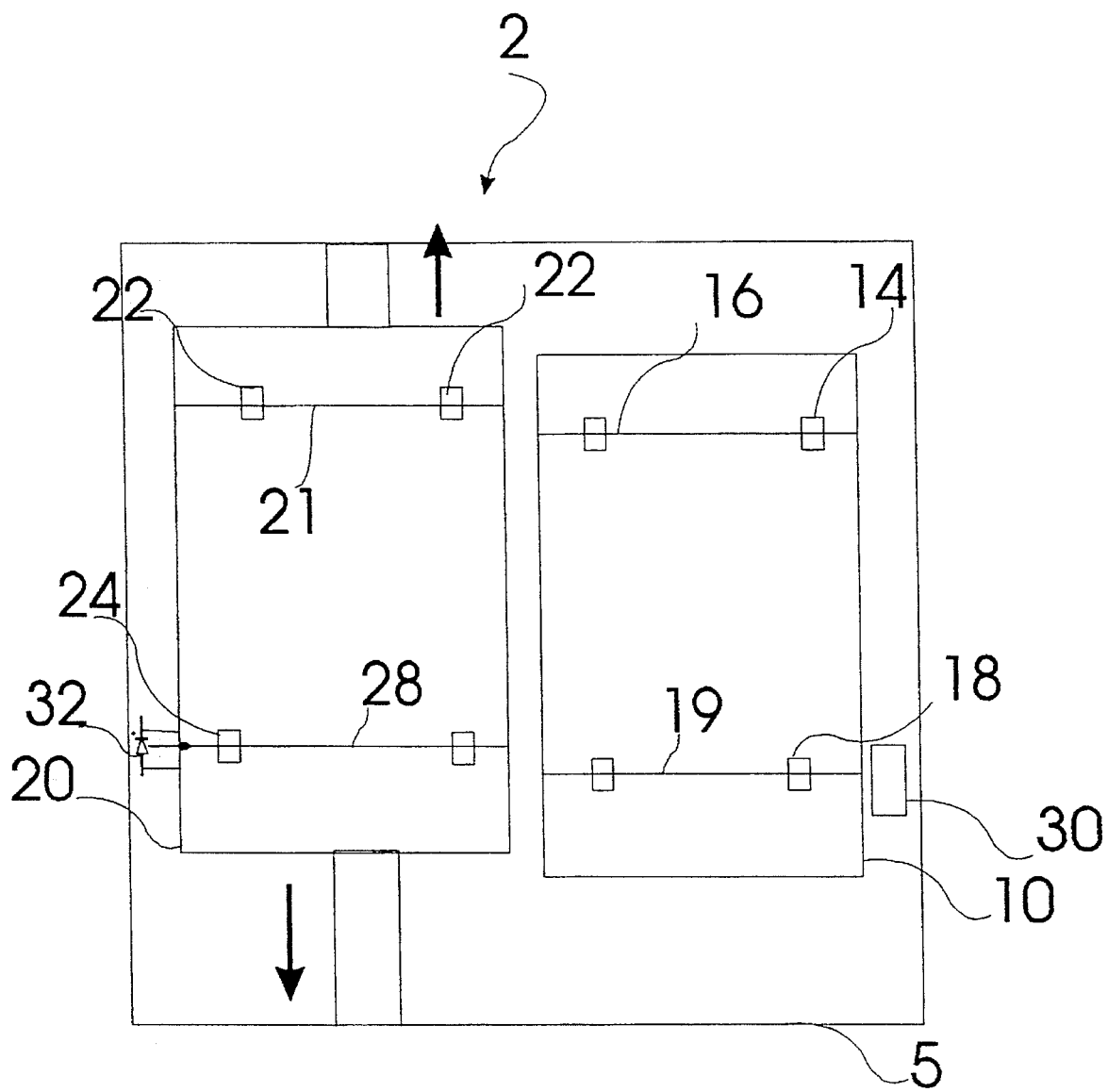
FIG. 2 is a block diagram of the mechanical optical on/off switch of FIG. 1, shown in a misaligned "off" position; and, FIG. 3 is an oblique view of a mechanical optical on/off switch including a motor for switching.

The operation of the switch is similar to that of the one described in FIGS. 1 and 2. An LED 316 provides a test signal to optical fiber 306. A detector 300 coupled to the 3 test fibers 308 provides information to the control circuitry relating to when one of the fibers 308 is best aligned with the test optical fiber 306. Since the optical fibers are "ganged" so that optical fibers 304 have a duplicate test group of fibers 308 identically spaced, information about the position of the test fiber 306 with respect to its axial aligned position to one of the test fibers 308 is used to determine corresponding positional information of fiber 302 with respect to its axial aligned position to fibers 304. Stated more simply, and by way of example, if fiber 306 is perfectly aligned with the second fiber of fibers 308, then optical fiber 302 must also be perfectly aligned with the second fiber of fibers 304.

"Ganging" of the optical fibers assures this.

Figure 4:
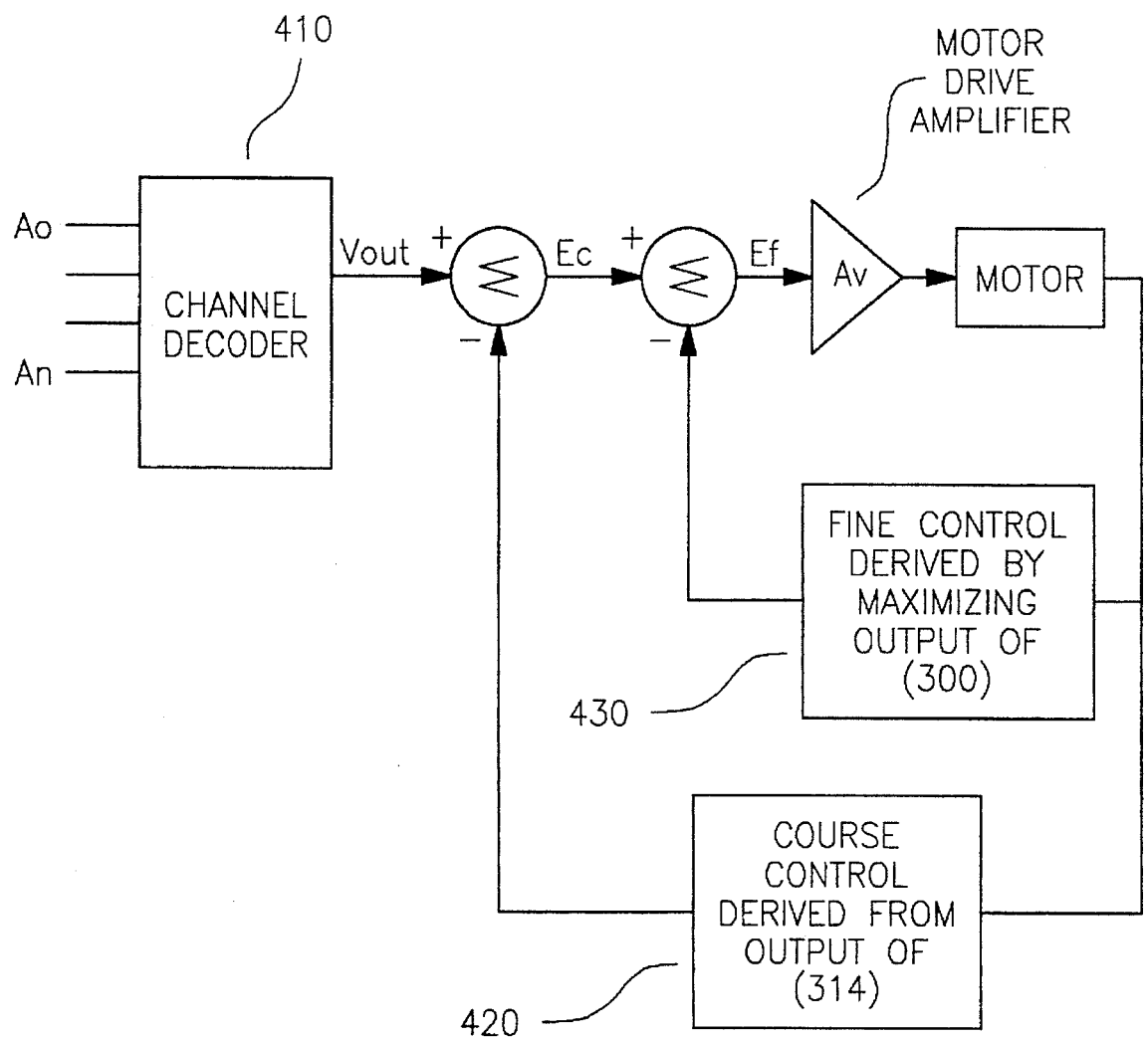
FIG. 4 is a block diagram of a control circuit for controlling the motor of FIG. 3.

Turning now to FIG. 4, a control circuit shown, for controlling the switch of FIG. 3. A D/A channel decoder 410 is provided and allows a user to select a desired address line $A_o$ to $A_n$ digitally. A particular output voltage $V_{out}$ is generated in dependence upon the channel selected. A circuit 420 that controls coarse loop control is coupled to the motor 310 and to the $V_{out}$ terminal. The circuit 420 drives the motor until ramp voltage from the position sensor 314 is equal to $V_{out}$ and the coarse error signal $E_c$=0. The position of the motor 310 is predetermined through calibration during assembly so as to allow some light to pass from the LED 316 to the detector 300 across the gap between 322 and 330 whenever $E_c \approx 0$. A circuit 430 coupled to the output $E_c$ and to the motor, controls the fine movement of the stage 320 as the circuit 430 further drives the motor 310 to move the stage 320 to a position such that the output of the detector 300 is maximized and so that the fine error signal $E_f \approx 0$.

In an alternative embodiment (not shown), the photodetector 30 is replaced with a position sensing detector (PSD). Coarse control is derived from any differential imbalance of the output of the PSD. Fine control is obtained by summing the differential output signals from the PSD.

Figure 5:
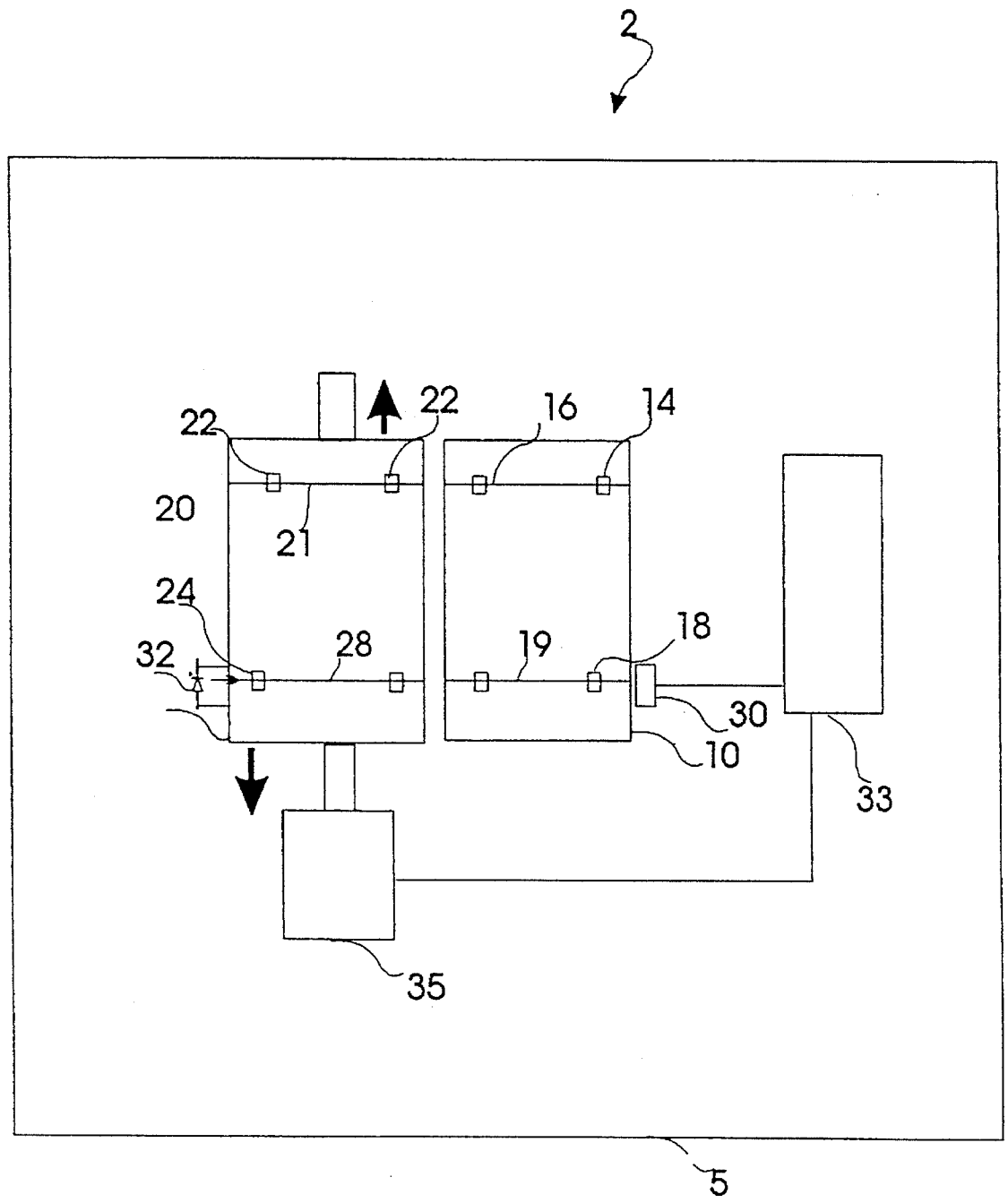
FIG. 5 is a block diagram of the switch of FIG. 1 and FIG. 2, including microprocessor control; and, FIGS. 6a and 6b are alternative optical fiber arrangements of the switch of FIGS. 1 and 2.

In yet another embodiment shown in FIG. 5, a microprocessor driven feedback system is shown, having a suitably programmed microprocessor 33 responsive to a digitized electrical output signal from the detector 30. A stepper motor 35 is electrically connected to the microprocessor 33 to receive an output control signal that controls it. The microprocessor is programmed to incrementally move the stepper motor as the intensity of the signal it receives from the detector 30 increases; when it moves the stepper motor 35 too far and the strength of the signal begins to lessen, the microprocessor sends a control signal to the motor 35 reversing its direction by one increment. Of course other types of feedback control may be envisaged for controlling the switching system.

Figure 6A:
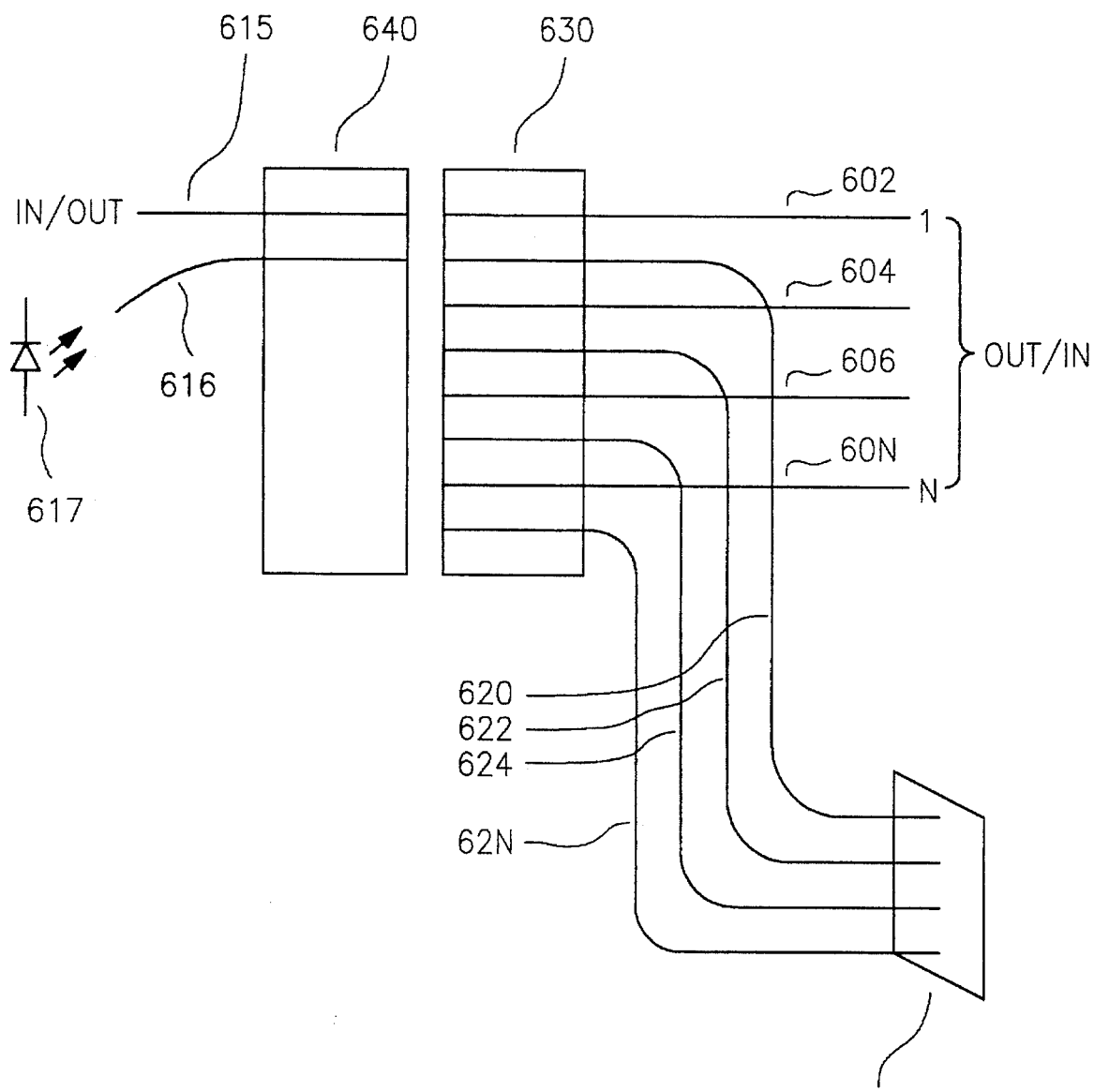
Figure 6B:
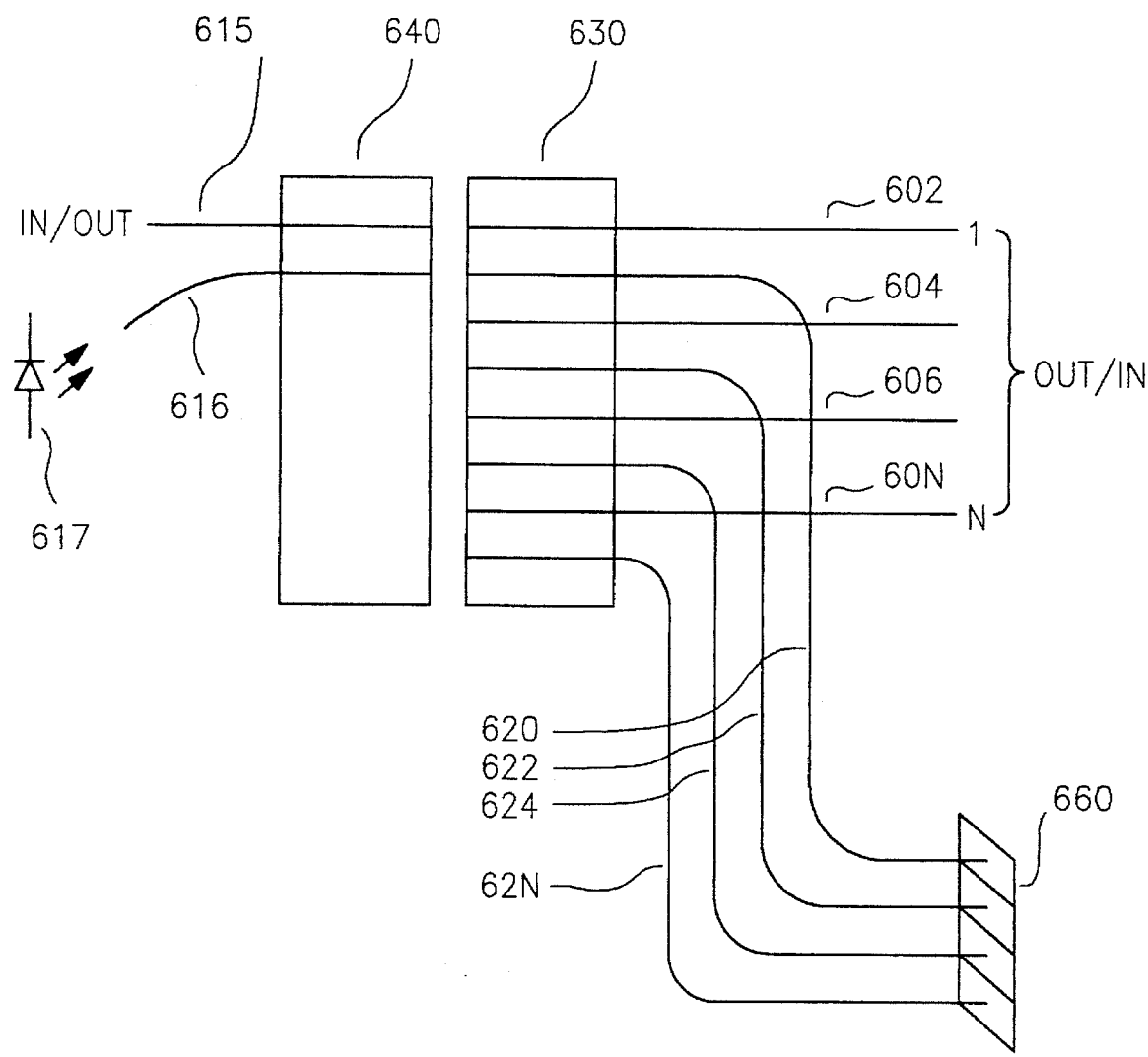

Turning now to FIGS. 6a and 6b, two embodiments of optical fiber arrangements for a "ganged" switch are shown. In FIG. 6a output input fibers 602, 604, 606, and 60n are spaced a same distance and mounted to a support member 630. In between each of these fibers, midway, are test fibers 620, 622, 624, and 62n. A second support member 640 carries a single fiber 615, and a test fiber 616 coupled to an LED 617. Fibers 615 and 616 are spaced so that when fiber 615 is axially aligned with the first fiber 602, test fiber 616 is axially aligned with test fiber 620. A single optical detector 300 such as a silicon PIN or a PSD is positioned to detect light from one of the test fibers 620 to 62n.

FIG. 6b shows a similar configuration to FIG. 6a, however, the optical detector is a multiple optical detector 660. Alternatively, n single detectors can be used, each test fiber being coupled to a different optical detector.

Numerous other embodiments may be envisaged without departing from the spirit and scope of the invention.

What I claim is:

1. An optical fiber switch comprising:

a first support member having at a first optical fiber securing means for securing a first optical fiber at a first location on said first support member, said support member having a second optical fiber securing means for securing a second optical fiber thereto at a second location a first predetermined distance from the first location;

a second support member having a first optical fiber securing means at a first location on the second support member for securing a third optical fiber, said first optical fiber securing means of the second support member being adjacent to the first optical fiber securing means of the first member, and having a second optical fiber securing means at a second location on the second support member spaced a second predetermined distance from the first securing means on the second support member, said second support member being coupled to and relatively movable with the first support member, so that an optical fiber secured at the first location on the first support member may be switched into and out of axial alignment with the third optical fiber at the first location on the second support member as the two support members are relatively moved along a substantial linear path;

means for radiating light into an alignment optical fiber that is secured to the second optical fiber securing means on the second support member; and, means for determining when the first optical fiber is in alignment with the third optical fiber, said means including, means coupled to the second optical fiber for detecting light from the second optical fiber and, means for determining when the intensity of the detected light is substantially at a maximum and for adjusting the position of the first and third optical fibers and the second optical fiber with the alignment fiber to best align them in dependence upon the determined maximum.

2. An optical fiber switch as defined in claim 1, wherein the means for adjusting the position of the first and third optical fibers to best align them includes means for relatively moving the first and second support members.

3. An optical fiber switch as defined in claim 2, including feedback means for providing a feedback signal for controlling the means for relatively moving the support members.

4. An optical fiber switch comprising:

a first support member having a first optical fiber securing means for securing a first plurality of optical fibers in a predetermined spaced relationship at a first location, said support member having a second optical fiber securing means for securing a second plurality of optical fibers at a second location a first predetermined distance from the first location;

a second support member having a first optical fiber securing means at a first location on the second support member for securing one or more optical fibers, said first optical fiber securing means being adjacent to the first optical fiber securing means on the first member, and having a second optical fiber securing means on the second support member at a second location on the second support means spaced a second predetermined distance from the first securing means on the second support member, said second support member being coupled to and relatively movable with the first support member, so that an optical fiber secured at the first location on the second support member may be axially aligned with different optical fibers of the first plurality of optical fibers at the first location on the first support member as the two support members are relatively moved along a substantially linear path;

means for radiating light into an alignment optical fiber that is secured to the second optical fiber securing means on the second support member; and, means for determining when an optical fiber secured by the second securing means on the first support member is in alignment with an alignment optical fiber, said means including, means coupled to the optical fiber secured by the second securing means on the first support member for detecting light from the alignment optical fiber and, means for determining when the intensity of the detected light is at a maximum and for relatively adjusting the position of said optical fiber with the alignment fiber to best align them in dependence upon the determined maximum.

5. An optical fiber switch as defined in claim 4, wherein the means for detecting light from an optical fiber includes a plurality of detectors, each detector coupled to one of the optical fibers of the second plurality of optical fibers.

6. An optical fiber switch as defined in claim 5, including means for relatively moving the first and second support members so that optical fibers on the first support member may be moved into or out of alignment with optical fibers on the second support member.

7. An optical fiber switch as defined in claim 6, including feedback means for providing a feedback signal to control the means for relatively moving the support members.

8. An optical switch for switching a first optical fiber into and out of axial alignment with a second optical fiber secured to a first and second carriage respectively, wherein the first and second carriages are relatively movable along a substantially linear path so that the secured optical fibers can be moved into and out of axial alignment, the switch comprising:

a first alignment optical waveguide secured to the first carriage at a predetermined location;

a second alignment optical waveguide secured to the second carriage at a predetermined location, the first and second alignment optical fibers being positioned at respective locations such that they are axially aligned when the first optical fiber and the second optical fibers are axially aligned;

means for radiating light into one of the first alignment optical waveguide and the second alignment optical waveguide;

means coupled to an end of the other of said first and second alignment waveguides, for providing an electrical control signal for moving the alignment optical waveguides into closer alignment in dependence upon the intensity of light detected at said end of said other of said first and second alignment waveguides; and, means responsive to the electrical control signal for moving the alignment optical waveguides into alignment.

9. A method for switching a first optical fiber into and out of axial alignment with a second optical fiber secured to a first and second carriage respectively, the first and second carriages respectively, each having secured thereto, an alignment optical waveguide spaced a predetermined distance from the first and second optical fibers, wherein the first and second carriage are relatively movable along a substantially linear path so that the secured optical fibers can be moved into and out of axial alignment, the method comprising the steps of:

a) directing optical radiation into one of the alignment optical waveguides that is secured to one of the carriages at a predetermined location; and, b) determining the relative position of the first and second carriage means by: detecting the intensity of the optical radiation radiating from the other alignment optical waveguide secured to the the other carriage when ends of the two alignment optical waveguides are proximate; and, c) relatively adjusting the position of the first and second optical fibers in dependence upon the detected intensity, the position being adjusted until the intensity of the detected light is at a maximum.

* * * * *